United States Patent

Högler

[11] Patent Number: 6,140,785
[45] Date of Patent: Oct. 31, 2000

[54] WINDSHIELD WIPER DEVICE

[75] Inventor: Eberhard Högler, Erligheim, Germany

[73] Assignee: ITT Manufacturing Enterprises, Inc., Wilmington, Del.

[21] Appl. No.: 09/269,697

[22] PCT Filed: Jul. 28, 1998

[86] PCT No.: PCT/EP98/04711

§ 371 Date: May 6, 1999

§ 102(e) Date: May 6, 1999

[87] PCT Pub. No.: WO99/06251

PCT Pub. Date: Feb. 11, 1999

[30] Foreign Application Priority Data

Jul. 29, 1997 [DE] Germany ............................ 197 32 520

[51] Int. Cl.[7] ................................. H02P 1/00; G05B 1/01
[52] U.S. Cl. .......................... 318/282; 318/286; 318/468; 318/DIG. 2
[58] Field of Search .................... 318/280–286, 318/443–446, 470, DIG. 2

[56] References Cited

U.S. PATENT DOCUMENTS

| 4,431,954 | 2/1984 | Carpenter et al. ................. 318/266 X |
| 4,614,903 | 9/1986 | Betsch et al. ............................ 318/443 |
| 4,866,357 | 9/1989 | Miller et al. ............................. 318/443 |
| 5,256,950 | 10/1993 | Matsumoto et al. ..................... 318/443 |
| 5,271,121 | 12/1993 | Dolegowski ................. 318/DIG. 2 X |
| 5,278,480 | 1/1994 | Murray ............................... 318/266 X |
| 5,285,138 | 2/1994 | Okada ..................................... 318/280 |
| 5,453,676 | 9/1995 | Agrotis et al. ...................... 318/443 X |
| 5,486,747 | 1/1996 | Welch ...................................... 318/811 |
| 5,506,483 | 4/1996 | McCann et al. ......................... 318/444 |
| 5,568,026 | 10/1996 | Welch ..................................... 318/443 |
| 5,929,588 | 7/1999 | Shiah .................................. 318/443 X |
| 5,973,464 | 10/1999 | Robbins ................................... 318/444 |

FOREIGN PATENT DOCUMENTS

| 29 17 324 A1 | 1/1980 | Germany . |
| 32 08 121 A1 | 9/1983 | Germany . |
| 40 32922 A1 | 4/1992 | Germany . |
| 44 28 543 A1 | 2/1996 | Germany . |
| 44 31 699 A1 | 3/1996 | Germany . |
| WO 96 39740 | 12/1996 | WIPO . |
| WO 98 08717 | 3/1998 | WIPO . |

OTHER PUBLICATIONS

JP 6–199206 A., In: Patents Abstracts of Japan, M–1692 Oct. 25, 1994, vol. 18/No. 559.

Primary Examiner—Brian Sircus
Attorney, Agent, or Firm—J. Gordon Lewis

[57] ABSTRACT

A windshield wiper device is described for a vehicle windshield, having a wiper motor that has a reversible direction of rotation. The wiper motor is controlled by an electronic unit with control signals. The electronic unit uses an operating mode and a learning mode, with which a reversal position of a wiper arm and/or a driven shaft can be stored in memory in the learning mode and called up as often as desired in the operating mode. In this way, a wiper motor is made that can be adapted to different operating cases with different wiped areas in a simple and cost-effective manner, without mechanical changes needing to be performed.

18 Claims, 2 Drawing Sheets

WINDSHIELD WIPER DEVICE

FIELD OF THE INVENTION

The invention involves a windshield wiper device for a vehicle windshield, having a wiper motor with a reversible rotational direction.

BACKGROUND OF THE INVENTION

From the patent DE 44 31 699 A1, a windshield wiper device with a wiper motor with a reversible rotational direction is known. This device uses a device to record the time that the wiper arm requires for a half wiper cycle, i.e., from an end position or park position until a reverse position. Furthermore, a time allowance device is provided, which specifies a maximum allowed time for a half wiper cycle. In a comparator, the maximum allowed time is compared with the time actually determined, and when this time is exceeded, a wiper operation is triggered in the opposite wiper direction. For this device, the wiped area that is covered is determined from the time allowance device and the correspondingly specified time values. Another wiped area, having another wiper angle, can only be adjusted in that the cycle time necessary for the new wiped area is determined in tests, and this time value is stored in the time allowance device. A simple modification of the wiped area or a subsequent compensation of the play that results within the wiper rod assembly during operation, which leads to a wiped area having a modified reversing situation that is modified to the new condition, is not possible.

From the patent WO 96/39740 a circuit arrangement for the control of a garage door drive is known. The circuit arrangement uses a switch with which a microprocessor can be set into a learning mode so that the maximum allowed force for the closing can be specified. It is further possible to determine and change the end positions of the garage door drive. This device is not suitable for use in vehicle wiper systems.

Finally, windshield wiper devices with gears are known, in which no reversal of the rotational direction of the electronic motor is performed. In these devices, the wiped area is a function of the gear mechanism, so that in order to change the wiped area, mechanical changes to the gear wheels or the allocated control arms are necessary.

SUMMARY OF THE INVENTION

The purpose of the invention presented here is thus to prepare a windshield wiper device having a motor with a reversible direction of rotation, in which any wiped area can be adjustably set in a simple and cost-effective manner. It is essential to the invention that it enables a single type of a windshield wiper device to apply to different application cases and for different types of automobiles. In other words, with one type of windshield wiper device, any possible application case should be covered without having to perform mechanical adjustments on the device itself. Furthermore, it should be possible to design the wiped area so that it can be adjusted after installation of the wiper system into an automobile for maintenance purposes.

The windshield wiper device has a processor which receives operating signals and sends control signals to the motor. The processor has an operating mode and a learning mode, where it can be switched into a learning mode by a switch signal so that a reversal position of the driven shaft and/or a reversal position of the wiper arm can be stored in a memory unit and can be called up as a wiper reversal position as often as desired in the operating mode. The invention thus involves the discovery that the reversal positions can be learned more or less in a testing operation, the learning mode, and can be reproduced in the operating mode. Mechanical changes for fitting the wiped area to the different circumstances or time measurements are not necessary as a result.

BRIEF DESCRIPTION OF THE DRAWINGS

The invention is described in greater detail using the drawing. The drawing shows.

DETAILED DESCRIPTION OF THE PREFERRED EMBODIMENT

Figure 1:
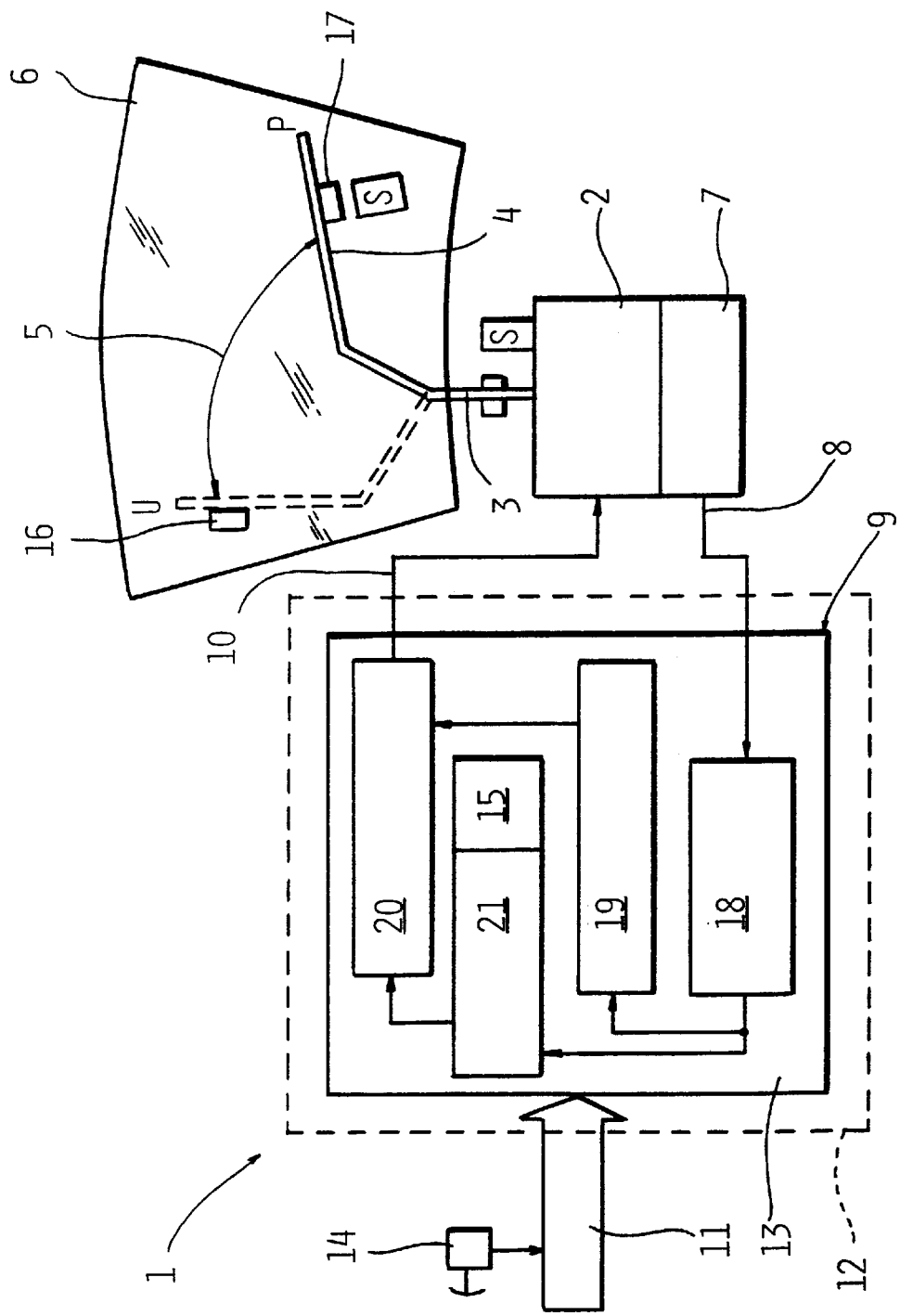
FIG. 1 is a schematic block diagram of a windshield wiper device according to the invention.

A windshield wiper device 1 includes a wiper motor 2 that can be reversed in its rotational direction and has a driven shaft 3 and a wiper arm 4 that is attached to it. A windshield wiper cleans a defined wiped area 5 of a vehicle windshield 6, removing dirt and contaminants. The wiped area is limited by a park position P and an outer reversal position U. The wiper motor 2 is equipped with a unit 7 for detecting the position of the driven shaft 3 and in addition or alternatively for detecting the position of the wiper arm 4. This unit 7 gives operating signals 8 to an electronic unit 9 in order to control the motor 2.

Two structural shapes of the position detection unit 7 can be distinguished. For a relative position sensing, a magnetic transmitting component is arranged on the driven shaft 3 and another magnetic transmitting component is arranged on a gear wheel of a reducing gear. To each transmitting component, a Hall sensor is allocated and the detection of rotational speed and rotational angle is done relative to the park position, which the transmitting component on the gear wheel side specifies. For absolute analog position sensing, only one transmitting component on the driven shaft side is planned for a sensor which signalizes the rotational angle of the driven shaft 3. From the rotational angle of the driven shaft and the rotational direction of the motor, the position of the wiper arm can then be calculated.

The wiper motor control is done as follows. An electronic unit 9 gives control signals 10 to the wiper motor 2, when an activation of a switch actuator has occurred beforehand in order to set the wiper motor 2 in motion. In FIG. 1, the activation that acts from the outside is indicated schematically by the arrow 11. As a result, the activation signals 11 as well as the operating signals 8 go over the system boundary 1 2 in the direction towards the electronic unit 9. On the other hand, the electronic unit 9 sends control signals 10 to the wiper motor 2. In the process, a constant comparison is made between the actual values determined by the position detection unit 7 and the target values calculated in the electronic unit 9 according to a certain control algorithm. According to the standard tolerance, an influence is made on the actuator wiper motor 2. It is understood that additional functions such as for example, interval switching, programmable interval switching, automatic reversing of the wiper motor 2 during total blocking, or similar special functions can also be implemented.

It is essential that the electronic unit 9 has a processor 13 which can be switched by a switching signal from an operating mode into a learning mode. The switch signal can for example, be supplied over an external, separate switch 14 as an activation 11 to the electronic unit 9. The learning mode allows the following: a defined, current position of the driven shaft 3 or the wiper arm 4 can be stored in a memory unit 15 and after being switched over into the operating mode, be called up as often as desired as a wiper reversal position. In other words, the end positions of the wiper arm are first determined after the windshield wiper device is completely assembled and possibly attached to the automobile. The wiped area is, in particular, not determined by an abstract time allowance device, but instead through a freely adjustable electronic unit 9. The adjustment of the desired wiper reversal position can be done simply and without specialized knowledge of electronics. In addition, a first and second switch signal can be provided, where by the first switch signal, the learning mode of the electronic unit 9 can be switched on, and by the second switch signal, a conversion can be made from the learning mode to the operating mode.

In an especially preferred embodiment form, the windshield wiper device can be switched over during learning mode more or less into a type of test operation, with which the wiped area can be completely fitted in an individual manner to the applied case that is present. This occurs as follows: On the vehicle windshield 6, at a certain distance from each other, stoppers 16, 17 are mounted, which define a desired wiped area. The stopper 16 symbolizes the desired outer reversal position of the wiper arm 4, and the stopper 17 symbolizes the park position.

It is fundamentally possible to not only adjust the reversal position but also to adjust the park position with the method described. However, the possibility does suggest itself of using a specific setting of the wiper motor 2 as a fixed reference point. Because in this way the park position is already determined, the stopper 17 could be left out and the programming of the park position would be obsolete.

In a next step, the electronic unit 9 is switched into the learning mode so that the wiper motor 2 goes into test operation and corresponding to the rotational direction of the transmitted control signal 10, proceeds with the wiper arm 4 starting from the park position in the direction towards the outer stopper 16. The position values of the driven shaft 3 or the wiper arm 4 are thus constantly transmitted to the electronic unit 9 via the unit in order to record the position 7. Within a certain time t, the electronic unit 9 thus obtains a certain number of operating signals 8. As soon as the wiper arm 4 hits against the stopper 16, the operating signals 8 are completely absent per unit of time, or they are greatly reduced. The last position of the wiper arm 4 reported to the electronic unit 9 is thus established as the reversal position and stored in a read-write memory unit (EE-PROM) 15.

As a result, the wiper motor 2 is reversed, thus reversed in its rotational direction, and the wiper arm 4 proceeds towards the other stopper 17. On this side, the routine described above repeats itself, if the park position is not specified by the machine-side reference point. After the conclusion of this procedure, the wiped area of the windshield wiper device is completely set and the electronic unit 9 is switched over to operating mode by a second switch signal. In the operating mode, the reversal position of the wiper arm 4 can be called up and reproduced as often as possible without being lost or automatically deleted.

It is possible, though, to switch the windshield wiper device again into learning mode, so that a new wiped area is programmable. As a result, the opportunity occurs, for windshield wiper devices 1 that are of an older operating age, to again determine the wiped area, so that the effect of mechanical play, which occurs in the course of time in linkages and mechanical transfer components, can be compensated.

The programming of the windshield wiper device 1 can also be integrated in an especially simple way into the manufacturing process. For example, to every vehicle model, a certain template is allocated, which has the stoppers 16, 17 and thus sets the boundaries of the desired wiped area. For programming, it is merely necessary to arrange the windshield wiper motor 2 in a receptacle so that the template is then arranged with the stoppers 16, 17 in relation to a rotational axis of the driven shaft 3, and then to start the learning mode. This makes it possible to provide every wiper motor 2 with an electronic unit 9, which has the wiped area data of a certain vehicle. Thus, no adjustment or programming work is necessary on the assembly line of the vehicle manufacturer. However, the possibility still arises for having an effect on the wiper end positions via the learning mode in this production stage or at a later operating stage.

Reference is made again to FIG. 1 for further explanation. From the FIGURE it can be gathered that the operating signals 8 supplied from the unit 7 for position detection are passed on to a position value counter 18. Two alternatives are conceivable corresponding to the operating signals 8. On the one hand, it is possible that too little or no signals are supplied over a specific time unit to the electronic unit 9. For this case, the blocking recognition 19 senses the blocking case and transmits a signal to the rotational direction reversal 20, which transmits a control signal 10 to the wiper motor 2 in order to reverse its rotational direction.

When the blocking case is not present, the current position value of the wiper arm 4 is constantly compared in a comparator 21 with the maximum possible position value of the wiper arm 4. For the case that the two values agree, the comparator 21 transmits a corresponding signal to the rotational direction reversal 20 in order to reverse the wiper motor 2. The individual structural units of the electronic unit 9 can be arranged both as separate processors or together on one processor. For example, the memory unit 15 is a component of the comparator 21.

Figure 2:
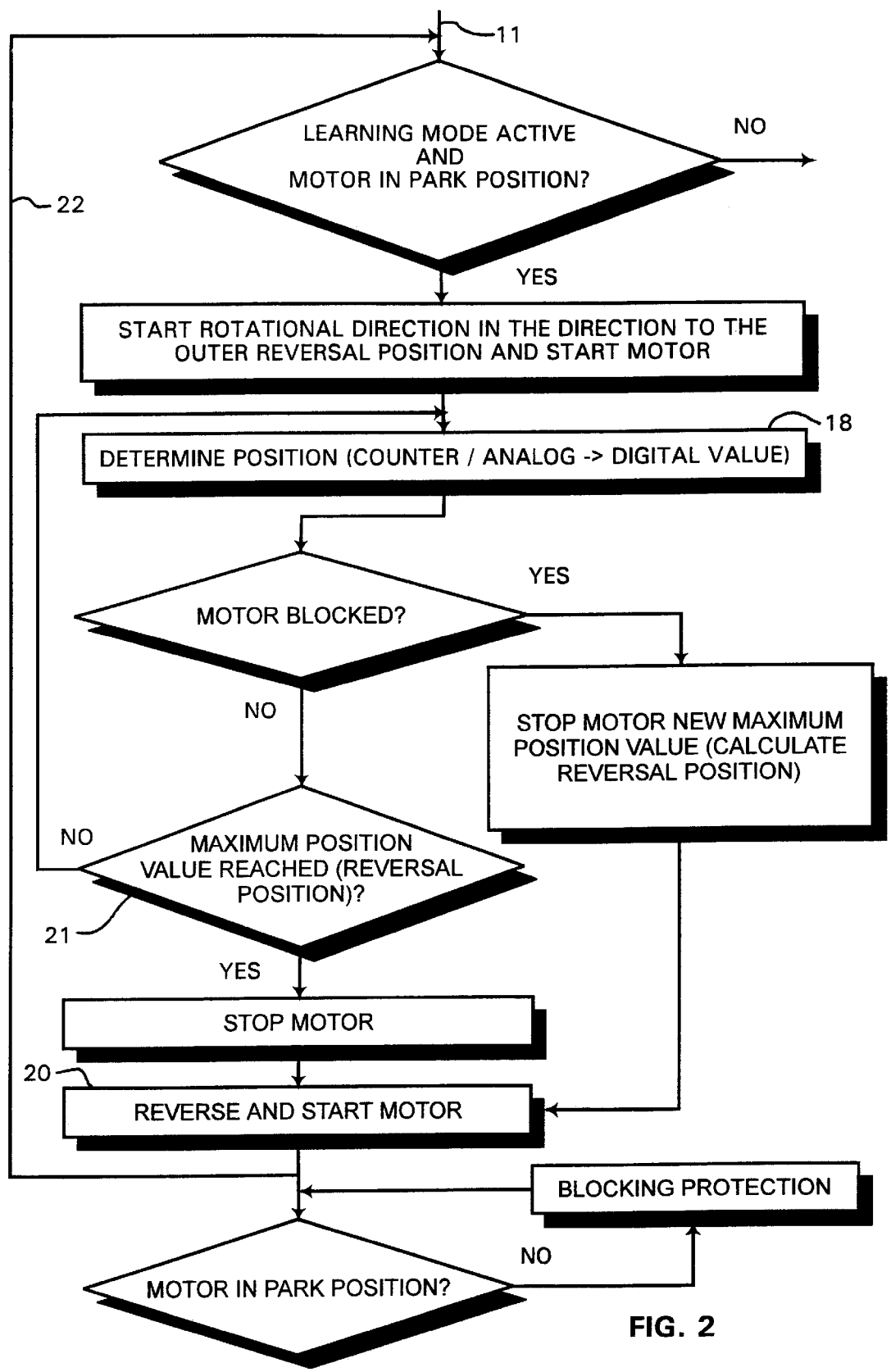
FIG. 2 is a schematic signal flow diagram to make clear the operating method of the windshield wiper device according to the invention.

In the following, FIG. 2 is described in greater detail. It starts from a condition in which the wiper arm 4 is located in the park position P. The park position is a reference point that is fixed on the machine, which is unambiguously defined by the position detection unit 7, for example, by a Hall sensor fixed on the housing and a magnetic transmitter component on the driven shaft 3. When the switch 14 has not transmitted a first signal, normal operation is in progress using the corresponding operating signals 10 for the wiper motor 2. By the activation of the switch 14, either a first or a second switch signal is transmitted to the electronic unit 9. By the second switch signal, the electronic unit 9 is set into operating mode so that the reversal position can be no longer be adjusted. If, though, a first switch signal is supplied to the electronic unit 9 as an activation 11, then the wiper motor 2 starts and the wiper arm 4 moves in the direction to the outer reversal position U. The current positions of the wiper arm 4 are constantly supplied to the position value counter 18 through the unit 7 as operating signals 8. This counter monitors the entrance of the position value signals within certain time intervals. When within the given time intervals, no position value signals enter, the motor is blocked and the rotational direction reversal 20 transmits a control signal 10 to brake to a stop and reverse the wiper motor 2. Provided a blocking is not in effect, a comparison of the current position values with the value of the outer reversal position occurs in the comparator 21. Provided the two values do not agree, a return guidance 22 occurs, so that the wiper motor 2 is operated further in the direction to the outer reversal position. If the position values agree, however, then the outer reversal position is reached and a corresponding control signal 10 occurs to brake to a stop, reverse and start the wiper motor 2.

It is understood that the procedure described can be performed multiple times one after the other when the intended result does not fulfill the requirements made of it. Furthermore, many embodiments and modifications of the invention can be made, without leaving the basic idea of the invention.

What is claimed is:

1. A windshield wiper device for a vehicle windshield comprising:

a wiper motor having a reversible rotational direction;

at least one unit for detecting a position of at least one of a driven shaft and a wiper arm; and an electronic unit for receiving operating signals from the at least one unit, and for sending control signals to the wiper motor, and having at least one operating mode and one learning mode, where a processor can be switched into the learning mode with a first switch signal, and a defined, current position of at least one of the driven shaft and the wiper arm can be stored in a memory unit while in the learning mode, and can be called up repeatedly in the operating mode as a wiper reversal position.

2. The windshield wiper device of claim 1, comprising:

a second switch signal sendable to the processor, so that with the first switch signal, the learning mode is switched on, and with the second switch signal, the operating mode is switched on.

3. The windshield wiper device of claim 1, comprising:

a separate switch for generating the switch signal.

4. The windshield wiper device of claim 1, comprising:

the electronic unit having at least one programmable memory unit in order to modifiably store reversal positions.

5. The windshield wiper device of claim 4, comprising:

the memory unit being an EEPROM.

6. The windshield wiper device of claim 1, comprising:

a template having at least one stopper in an area of an outer reversal position of the wiper arm, so that together with a motor-side reference point, a wiped area is defined.

7. The windshield wiper device of claim 1, comprising:

the device having at least one magnetic transmitting component on the driven shaft, which is allocated to a Hall sensor, so that a current position can be determined in an absolute analog manner.

8. The windshield wiper device of claim 1, comprising:

a magnetic transmitting component arranged on the driven shaft; and another transmitting component arranged on a gear wheel, such that a current position of the driven shaft can be determined relative to a park position of the driven shaft.

9. A process for adjusting the wiped area and/or the reversal position for a wiper device comprising the steps of:

switching a processor into a learning mode;

performing at least one wiper movement until movement is limited by a stopper; and storing the limiting position in memory as a reversal position so that after switching over into an operating mode, a desired wiped area with a corresponding reversal position, can be called up repeatedly.

10. The process according to claim 9, further comprising the step of:

storing a wiped area with a corresponding reversal position in memory repeatedly in memory, in a manner so that the memory can be written over.

11. In a windshield wiper device for a vehicle windshield having a wiper motor driving a driven shaft with a reversible rotational direction for powering reciprocal sweeping movement of a wiper arm, the improvement comprising:

at least one unit for detecting a position of at least one of the driven shaft and the wiper arm; and an electronic unit for receiving operating signals from the at least one unit, and for sending control signals to the wiper motor, and having at least one operating mode and only one learning mode, where a processor can be switched into the one learning mode with a first switch signal, and a defined, current position of at least one of the driven shaft and the wiper arm can be stored in a memory unit while in the one learning mode, and can be called up repeatedly in the operating mode as a wiper reversal position.

12. The improvement of claim 11 comprising:

a second switch signal sendable to the processor, so that with the first switch signal, the learning mode is switched on, and with the second switch signal, the operating mode is switched on.

13. The improvement of claim 11 comprising:

a separate switch for generating the switch signal.

14. The improvement of claim 11 comprising:

the electronic unit having at least one programmable memory unit in order to modifiably store reversal positions.

15. The improvement of claim 14 comprising:

the memory unit being an EEPROM.

16. The improvement of claim 11 comprising:

a template having at least one stopper in an area of an outer reversal position of the wiper arm, so that together with a motor-side reference point, a wiped area is defined.

17. The improvement of claim 11 comprising:

the device having at least one magnetic transmitting component on the driven shaft, which includes a Hall sensor, so that a current position can be determined in an absolute analog manner.

18. The improvement of claim 11 comprising:

a magnetic transmitting component arranged on the driven shaft; and another transmitting component arranged on a gear wheel, such that a current position of the driven shaft can be determined relative to a park position of the driven shaft.

* * * * *